(12) United States Patent
Girard et al.

(10) Patent No.: US 12,227,040 B2
(45) Date of Patent: Feb. 18, 2025

(54) PNEUMATIC TIRE FOR VEHICLE WITH REINFORCING STRUCTURE IN THE LOWER TORIC CAVITY

(71) Applicant: COMPAGNIE GENERALE DES ETABLISSEMENTS MICHELIN, Clermont-Ferrand (FR)

(72) Inventors: Mathieu Girard, Clermont-Ferrand (FR); Bertrand Daval, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 458 days.

(21) Appl. No.: 16/771,173

(22) PCT Filed: Dec. 7, 2018

(86) PCT No.: PCT/FR2018/053147
§ 371 (c)(1),
(2) Date: Jun. 9, 2020

(87) PCT Pub. No.: WO2019/115917
PCT Pub. Date: Jun. 20, 2019

(65) Prior Publication Data
US 2021/0162808 A1 Jun. 3, 2021

(30) Foreign Application Priority Data
Dec. 11, 2017 (FR) ...................................... 17/61883

(51) Int. Cl.
*B60C 9/06* (2006.01)
*B60C 9/17* (2006.01)
(Continued)

(52) U.S. Cl.
CPC .................. *B60C 9/06* (2013.01); *B60C 9/17* (2013.01); *B60C 9/30* (2013.01); *B60C 2009/0215* (2013.01); *B60C 2009/0475* (2013.01)

(58) Field of Classification Search
CPC .... B60C 9/06; B60C 9/14; B60C 9/17; B60C 9/30; B60C 2009/0215; B60C 2009/0475;
(Continued)

(56) References Cited

U.S. PATENT DOCUMENTS 4,305,446 A * 12/1981 Brown, Jr. ......... B29D 30/0661
152/452
4,936,365 A * 6/1990 Chrobak ............... B60C 13/004
152/452
(Continued)

FOREIGN PATENT DOCUMENTS

DE 102006046195 A1 * 4/2008 ............. B60C 19/00
DE 102014018639 A1 * 6/2016 ............... B60C 5/12
(Continued)

OTHER PUBLICATIONS

RHP GmbH, DE-102006046195-A1, machine translation. (Year: 2008).*
(Continued)

*Primary Examiner* — Sedef E Paquette
(74) *Attorney, Agent, or Firm* — COZEN O'CONNOR

(57) ABSTRACT

A tire with improved handling having a stiffening structure with a stiffening element extending continuously in the toroidal interior cavity from a crown interface connected to a radially inner face of the crown to a bead interface connected to an axially inner face of the bead. The stiffening structure is distributed circumferentially over the circumference of the tire, the axially outermost stiffening element interface is positioned, with respect to the equatorial plane
(Continued)

(XZ), at an axial distance A at most equal to 0.45 times the axial width S, and the radially outermost stiffening element bead interface is positioned, with respect to a radially innermost point (I) of the axially inner face of the bead at a radial distance B at most equal to 0.5 times the radial height H.

9 Claims, 6 Drawing Sheets

(51) Int. Cl.
    *B60C 9/30*    (2006.01)
    *B60C 9/02*    (2006.01)
    *B60C 9/04*    (2006.01)

(58) Field of Classification Search
CPC . B60C 2009/145; B60C 13/00; B60C 13/002; B60C 15/028; B60C 17/00; B60C 17/009; B60C 17/04; B60C 17/041; B60C 17/06; B60C 2017/0081; B60C 2017/068; B60C 19/00
USPC .......................................... 152/516, 555, 556
See application file for complete search history.

(56) References Cited

U.S. PATENT DOCUMENTS 6,824,724 B2 * 11/2004 Mori .................. B29C 43/3642
    264/315
2009/0159215 A1 * 6/2009 Agostini ............ B29D 30/0654
    156/421.6

FOREIGN PATENT DOCUMENTS

| | | | |
|---|---|---|---|
| DE | 102015013441 B3 * | 2/2017 | |
| FR | 2 638 398 | 5/1990 | |
| GB | 2 299 554 | 10/1996 | |
| JP | 2015 077922 | 4/2015 | |
| WO | WO-2005063505 A1 * | 7/2005 | ............... B60B 9/02 |
| WO | WO 2017/005713 | 1/2017 | |
| WO | WO 2019/092343 | 5/2019 | |

OTHER PUBLICATIONS

Schmidt O, DE-102015013441-B3, machine translation. (Year: 2017).*
Klinger T, DE-102014018639-A1, machine translation. (Year: 2016).*

* cited by examiner

PNEUMATIC TIRE FOR VEHICLE WITH REINFORCING STRUCTURE IN THE LOWER TORIC CAVITY

RELATED APPLICATIONS

This is a U.S. National Phase Application under 35 USC 371 of International Application PCT/FR2018/053147 filed Dec. 7, 2018.

This application claims the priority of French application no. 17/61883 filed Dec. 11, 2017, the entire content of which is hereby incorporated by reference.

FIELD OF THE INVENTION

The invention relates to a radial tire intended to be fitted to a vehicle.

BACKGROUND OF THE INVENTION

The field of tires more particularly under study here is that of passenger vehicle tires, the meridional cross section of which is characterized by a section width S and a section height H, within the meaning of the European Tire and Rim Technical Organisation, or ETRTO, standard, such that the ratio H/S, expressed as a percentage, is at most equal to 65, and the section width S is at least equal to 195 mm. Moreover, the diameter at the seat D, defining the diameter of the mounting rim of the tire, is at least equal to 15 inches, and generally at most equal to 21 inches. The example more particularly being studied in the context of the invention is a tire of the size 205/55R16.

However, a tire according to the invention may equally be used on any other type of vehicle, such as a two-wheeled vehicle, a heavy-duty vehicle, an agricultural vehicle, a construction plant vehicle or an aircraft or, more generally, on any rolling device.

In the following text, and by convention, the circumferential direction XX', axial direction YY' and radial direction ZZ' refer to a direction tangential to the tread surface of the tire in the direction of rotation of the tire, to a direction parallel to the axis of rotation of the tire, and to a direction perpendicular to the axis of rotation of the tire, respectively. "Radially inside" and "radially outside" mean "closer to the axis of rotation of the tire" and "further away from the axis of rotation of the tire", respectively. "Axially inside" and "axially outside" mean "closer to the equatorial plane of the tire" and "further away from the equatorial plane of the tire", respectively, the equatorial plane XZ of the tire being the plane passing through the middle of the tread surface of the tire and perpendicular to the axis of rotation of the tire.

In general, a tire comprises a crown having two axial ends, each one extended radially towards the inside, by a sidewall and then by a bead intended to come into contact with a rim, the assembly delimiting a toroidal interior cavity. More specifically, the crown comprises, radially from the outside towards the inside, a tread, intended to come into contact with the ground via a tread surface, and a crown reinforcement intended to reinforce the crown of the tire. A carcass reinforcement connects the two sidewalls to one another and is anchored, in each bead, to a circumferential reinforcing element usually of the bead wire type.

The standards relating to tires, for example such as those of the ETRTO, define the nominal conditions of use for a tire of a given size, characterized by a section width S, a section height H and a seat diameter D. Thus, a tire of a given size is intended to be mounted on a nominal rim, to be inflated to a nominal pressure P and to be subjected to a nominal load Z. The load applied to the tire is thus absorbed by the tire, by virtue of its pneumatic stiffness, resulting from the inflation pressure, and by virtue of its intrinsic structural stiffness.

A tire needs to meet a number of performance criteria such as, by way of example and not exhaustively, the handling, rolling resistance, grip, wear and noise, something which often involves mutually-contradictory design choices. It is thus often the case that design choices made to improve one given performance aspect lead to a worsening of another performance aspect. This is the case, for example, when seeking a satisfactory compromise between handling and rolling resistance.

It is known that the handling of a tire, which characterizes its ability to withstand the various mechanical stress loadings to which it is subjected during running, such as cornering stress loadings and/or transverse stress loadings, is essentially dependent on its mechanical cornering stiffness $D_Z$ and transverse stiffness $K_{YY}$, respectively. The higher these mechanical stiffnesses, the better the handling of the tire.

In the prior art, in order to improve the handling of the tire, the person skilled in the art has, for example, designed very stiff tire beads, having a significant volume resulting from a high axial thickness and/or high radial height, and comprising elastomeric materials that have a high elastic modulus and high hysteresis, namely materials that are both stiff and dissipative. The counterpart to such a design is an increase in the rolling resistance value, and therefore worsening of the rolling resistance performance, with a corresponding increase in fuel consumption.

An alternative solution to the conventional tire is proposed in document WO2017005713, in the form of a tire-type device comprising two, a radially outer, and a radially inner, structures of revolution, a bearing structure made up of identical load-bearing elements, in extension outside the ground contact patch and in compression in the contact patch, and two sidewalls. The bearing elements are filamentary and are connected to the radially inner face of the radially outer structure of revolution by a radially outer fabric and to the radially outer face of the radially inner structure of revolution by a radially inner fabric, respectively. Furthermore, the mean surface density D of the bearing elements per unit area of radially outer structure of revolution, expressed in $1/m^2$, is at least equal to $(S/S_E)*Z/(A*F_r)$, where S is the area, in $m^2$, of the radially inner face of the radially outer structure of revolution, $S_E$ is the connecting area, in $m^2$, of the radially outer fabric with the radially inner face of the radially outer structure of revolution, Z is the nominal radial load, in N, A is the area of contact with the ground, in $m^2$, and $F_r$ is the force at break, in N, of a bearing element. This solution makes it possible to eliminate the dissipative beads of a conventional tire and therefore to reduce the rolling resistance drastically, while at the same time ensuring good handling thanks to the fact that the filamentary elements of the bearing structure react the cornering and transverse mechanical stress loadings. However, this tire device has in particular the disadvantage of entailing the use of a non-standard rim.

SUMMARY OF THE INVENTION

The inventors have set themselves the objective of designing a tire, able to be mounted on a standard rim, with improved handling in comparison with a standard tire of the prior art, and with a rolling resistance at most equal to that of this reference tire.

This objective has been achieved by a vehicle tire, intended to be mounted on a nominal rim and inflated to a nominal pressure P, having an axial width S and a radial height H in the mounted and inflated state, and comprising:
- a crown having a radially outer tread surface, intended to come into contact with the ground, and two axial ends, each extended radially towards the inside by a sidewall and then by a bead intended to come into contact with the rim.
- the crown, the sidewalls and the beads delimiting a toroidal interior cavity,
- the tire having an equatorial plane passing through the middle of its tread surface and perpendicular to an axis of rotation,
- the tire comprising a stiffening structure, comprising at least one stiffening element extending continuously in the toroidal interior cavity, from a crown interface connected to a radially inner face of the crown, to a bead interface connected to an axially inner face of the bead,
- the stiffening structure being distributed circumferentially over the entire circumference of the tire,
- the axially outermost stiffening element crown interface being positioned, with respect to the equatorial plane, at an axial distance A at most equal to 0.45 times the axial width S,
- and the radially outermost stiffening element bead interface being positioned, with respect to a radially innermost point of the axially inner face of the bead, at a radial distance B at most equal to 0.5 times the radial height H.

The principle behind the invention is to integrate, into a conventional tire, a stiffening structure that is intended to increase the overall stiffness of the tire, this stiffness having a structural component, referred to as structural stiffness, afforded by the reinforcing structure of the tire, and a tire component, referred to as the tire stiffness, afforded by the pressure of the inflation gas. The stiffening structure contributes to the tire stiffness.

More specifically, the stiffening structure according to the invention makes it possible simultaneously to increase the radial stiffness $K_{ZZ}$, the transverse or axial stiffness $K_{YY}$, and the cornering stiffness $D_Z$ of the tire, by comparison with the reference tire. The radial stiffness $K_{ZZ}$, expressed in daN/mm, is the radial force $F_Z$ generated by the tire upon application of a radial displacement equal to 1 mm. The transverse or axial stiffness $K_{YY}$, expressed in daN/mm, is the axial force $F_Y$ generated by the tire upon application of an axial displacement equal to 1 mm. And finally, the cornering stiffness $D_Z$, expressed in daN/°, is the axial force $F_Y$ generated by the tire during running with an angle of 1° applied about a radial axis ZZ'.

By increasing the radial stiffness $K_{ZZ}$, the stiffening structure limits the radial deformations of the crown, during running, and, in particular, the reverse-deformation, namely the radial deformation opposite the contact patch in which the tread surface of the tire is in contact with the ground. Thus, during the running of the tire, as the wheel turns, the stiffening structure makes it possible to limit the amplitude of the cyclic deformations of the tire, and particularly of the tread thereof, and therefore limit the resultant dissipation of energy, thereby contributing to reducing the rolling resistance. Furthermore, under the radial stress loading, the ground contact patch is unchanged, namely substantially maintains the same surface area, making it possible to maintain the same performance as for the reference tire in terms of grip.

By increasing the transverse or axial stiffness $K_{YY}$ and the cornering stiffness $D_Z$, the stiffening structure will contribute to improving the handling, under transverse stress loading, for example when running with drift thrust. Furthermore, under transverse stress loading, the ground contact patch ensures the most uniform possible distribution of the contact pressures, thereby making it possible to increase the performance in terms of transverse grip.

Furthermore, the stiffening structure contributes at least partially to bearing the load applied to the tire, so that this applied load is reacted jointly by the tire, by virtue of its tire stiffness and of its intrinsic structural stiffness, and by the stiffening structure. Regarding load-bearing, when the tire is subjected to a nominal radial load Z, the portion of stiffening structure that is connected to the portion of tire in contact with the ground is subjected to compressive distortion and the portion of stiffening structure connected to the portion of tire not in contact with the ground is at least partially under tension.

As a result, the presence of a stiffening structure makes it possible to reduce the contribution made by the reinforcing structure of the tire to the load-bearing, and therefore, where appropriate, makes it possible for its intrinsic structural stiffness to be reduced, for example by reducing the volume of the beads. Since the beads of a conventional tire, as is known, dissipate a significant amount of energy because of their volume and because of the hysteresis-prone nature of the elastomeric compound of which they are made, reducing their volume would thus make it possible to significantly reduce the rolling resistance.

Finally, the stiffening structure makes it possible to alter the vibrational response of the tire to a dynamic loading at a given frequency. The inventors have demonstrated by numerical simulation that the maximum on the curve representing the vibrational response, in dB(A), as a function of frequency, expressed in Hz, as well as the integral of the said curve, are reduced for a tire according to the invention by comparison with a conventional tire considered as reference, something which ought in theory to have a positive impact on the reduction of exterior noise.

From a structural standpoint, according to the invention, the stiffening structure comprises at least one stiffening element extending continuously in the toroidal interior cavity, from a crown interface connected to a radially inner face of the crown, to a bead interface connected to an axially inner face of the bead. In other words, the stiffening structure comprises at least one stiffening element connecting the crown of the tire to a bead, and this creates triangulation between the respectively radially outer and inner portions of the tire. The connections between the stiffening element and, respectively, the crown and the bead, may be either direct or indirect, for example via an attachment means.

Furthermore, the stiffening structure is distributed circumferentially over the entire circumference of the tire. More specifically, the stiffening structure either extends circumferentially and continuously over the entire circumference of the tire, is distributed circumferentially and periodically over the entire circumference of the tire. As a result, the triangulation between the crown and the beads of the tire is effective over the entire circumference of the tire.

Also according to the invention, the axially outermost stiffening element crown interface is positioned, with respect to the equatorial plane, at an axial distance A at most equal to 0.45 times the axial width S. In instances in which the stiffening structure comprises several stiffening elements, the axial position of the axially outermost crown interface dictates the respective axial positions of the other crown interfaces which are, therefore, necessarily closer to the equatorial plane. Beyond this value, any stiffening element has a mean direction that makes too small an angle with respect to the radial direction ZZ', thus making an insufficient contribution to the transverse stiffness $K_{YY}$ and cornering stiffness $D_Z$, respectively. However, even in the case of an angle close to 0°, the inventors have been able to observe an increase in the radial stiffness $K_{ZZ}$, transverse stiffness $K_{YY}$ and cornering stiffness $D_Z$, respectively.

Again according to the invention, the radially outermost stiffening element bead interface is positioned, with respect to a radially innermost point of the axially inner face of the bead, at a radial distance B at most equal to 0.5 times the radial height H. In instances in which the stiffening structure comprises several stiffening elements, the radial position of the radially outermost bead interface dictates the respective radial positions of the other bead interfaces which are, therefore, necessarily closer to the radially innermost point of the axially inner face of the bead also referred to as the bead toe. Beyond this value, any stiffening element has a mean direction that makes too large an angle with respect to the radial direction ZZ', thus making an insufficient contribution to the radial stiffness $K_{ZZ}$, transverse stiffness $K_{YY}$ and cornering stiffness $D_Z$, respectively.

As a preference, the stiffening structure comprises several stiffening elements not joined to one another in the toroidal interior cavity. The stiffening elements are not mechanically joined together in the interior toroidal cavity of the tire so that they behave mechanically independently of one another. For example, they are not connected together so as to form a network or a lattice. More particularly, the stiffening elements do not divide the toroidal interior cavity into several mutually sealed and independent cavities. The inflation gas, usually air, can thus circulate freely between the stiffening elements, throughout the entire toroidal interior cavity, without the creation of pressure differentials across these stiffening elements.

According to one preferred embodiment, the at least one stiffening element of the stiffening structure extends continuously in the toroidal interior cavity without intersecting the equatorial plane. In other words, a stiffening element extends on the one same side of the equatorial plane and does not intersect this plane. Therefore, two stiffening elements extending one on each side of the equatorial plane never intersect each other. The presence of stiffening elements on each side of the equatorial plane makes it possible to have stiffening of the two tire halves situated on each side of the equatorial plane.

According to a preferred variant of the previous preferred embodiment, the stiffening structure is symmetric with respect to the equatorial plane. In other words, any stiffening element extending on one side of the equatorial plane has a symmetrical counterpart extending on the opposite side. This embodiment allows the forces passing through the stiffening structure to be distributed equally between the two halves of the tire, and therefore makes it possible for the tire to handle symmetrically during running. Furthermore, a stiffening structure that is symmetrical is simpler to manufacture.

As a preference, the axially outermost stiffening element crown interface is positioned, with respect to the equatorial plane, at an axial distance A at most equal to 0.15 times and at least equal to 0.05 times the axial width S. The inventors have effectively demonstrated that an axial distance A substantially equal to 0.10 times the axial width S was an advantageous embodiment.

Again as a preference, the radially outermost stiffening element bead interface is positioned, with respect to a radially innermost point of the axially inner face of the bead, at a radial distance B at most equal to 0.10 times, preferably at most equal to 0.05 times the radial height H. The inventors effectively demonstrated that a near-zero radial distance B was an advantageous embodiment.

The combination of these two features regarding the preferred positioning of the crown and bead interfaces respectively makes it possible to ensure optimum inclination of the stiffening elements, with respect to a radial direction, namely ones that guarantee a good compromise between the the radial stiffness $K_{ZZ}$, transverse stiffness $K_{YY}$ and cornering stiffness $D_Z$.

Usually, the stiffening structure is made up of mutually identical stiffening elements, as this ensures uniformity of operation and makes for ease of manufacture.

As regards the materials which make up the stiffening structure, any stiffening element comprises a polymeric material, such as an aliphatic polyamide, an aromatic polyamide or a polyester, or a metal material, such as steel, or a glass- or carbon-type material or any combination of the above materials. Polymer materials, in particular elastomer materials, and metal materials, such as steel, are commonly used in the field of tires. Glass and carbon are alternative materials that are conceivable for use in tires. In a first variant of the material, any stiffening element advantageously comprises polyethylene terephthalate (PET). PET is commonly used in the field of tires on account of a good compromise between its mechanical properties, such as its resistance to breaking under tension, and its cost. In a second variant of the material, any stiffening element also advantageously comprises an aliphatic polyamide, such as nylon. Nylon is also commonly used in the field of tires for the same reasons as PET.

Each stiffening element may be characterized geometrically, on the one hand, by its length L, which is the distance separating its two ends intended to become its crown and bead interfaces respectively, and, on the other hand, by its mean section $S_m$. The mean section $S_m$ is the mean of the sections obtained by sectioning the stiffening element on all the surfaces perpendicular to its mean line. In the most frequent case of a constant section, the mean section $S_m$ is the constant section of the stiffening element. The mean section $S_m$ comprises a largest characteristic dimension $D_{max}$ and a smallest characteristic dimension $D_{min}$, the ratio $R=D_{max}/D_{min}$ of which is known as the aspect ratio. By way of examples, a stiffening element having a circular mean section $S_m$ having a diameter equal to d, has an aspect ratio R=1, a stiffening element having a rectangular mean section $S_m$, having a length L and a width l, has an aspect ratio R=L/l, and a stiffening element having an elliptical mean section $S_m$, having a major axis D and a minor axis d, has an aspect ratio R=D/d.

According to a first embodiment of the stiffening elements, any stiffening element is a two-dimensional element. A stiffening element is considered to be two-dimensional when the aspect ratio R of its mean section $S_m$ is at least equal to 3, namely when the largest characteristic dimension $D_{max}$ of its mean section $S_m$ is at least equal to 3 times the smallest characteristic dimension $D_{min}$ of its mean section $S_m$. A two-dimensional stiffening element has mechanical behaviour of the membrane type, that is to say that it can be subjected only to tensile or compression forces perpendicular to its mean section $S_m$. According to a first variant, a stiffening element, with an aspect ratio R at least equal to 3 and at most equal to 50 is said to be two-dimensional of the strip type. According to a second variant, a stiffening element, with an aspect ratio R at least equal to 50 is said to be two-dimensional of the film type.

According to a preferred variant of the first embodiment with two-dimensional stiffening elements, any two-dimensional stiffening element is made up of a reinforcing fabric comprising reinforcing elements coated in an elastomer compound. A stiffening structure made up of two-dimensional stiffening elements, particularly of the film type, affords structural homogeneity around the entire circumference of the tire and is advantageous, from a manufacturing standpoint, by allowing the placement of a single product thereby contributing to high productivity.

According to a second embodiment of the stiffening elements, any stiffening element is a one-dimensional element of the thread or cord type. A stiffening element is considered to be one-dimensional when the aspect ratio R of its mean section $S_m$ is at most equal to 3, namely when the largest characteristic dimension $D_{max}$ of its mean section $S_m$ is at most equal to 3 times the smallest characteristic dimension $D_{min}$ of its mean section $S_m$. A one-dimensional stiffening element has mechanical behaviour of the filamentary type, that is to say that it can be subjected only to tensile or compression forces along its mean line. This is why a one-dimensional stiffening element is usually referred to as a filamentary stiffening element. Among components that are commonly used in the field of tires, textile reinforcers, made up of an assembly of spun textile filaments, or metal cords, made up of an assembly of metal threads, can be considered one-dimensional stiffening elements, since, their mean section $S_m$ being substantially circular, the aspect ratio R is equal to 1, and thus less than 3. It should be noted that the one-dimensional stiffening elements are not necessarily positioned in a meridian or radial plane containing the axis of rotation of the tire but may be inclined with respect to the latter by an inclination liable to have an impact on the circumferential stiffness $K_{XX}$ of the tire.

BRIEF DESCRIPTION OF THE DRAWINGS

Aspects of the invention are illustrated in the figures referenced hereinbelow, which are not to scale and are described below.

DETAILED DESCRIPTION OF THE DRAWINGS

Figure 1A:
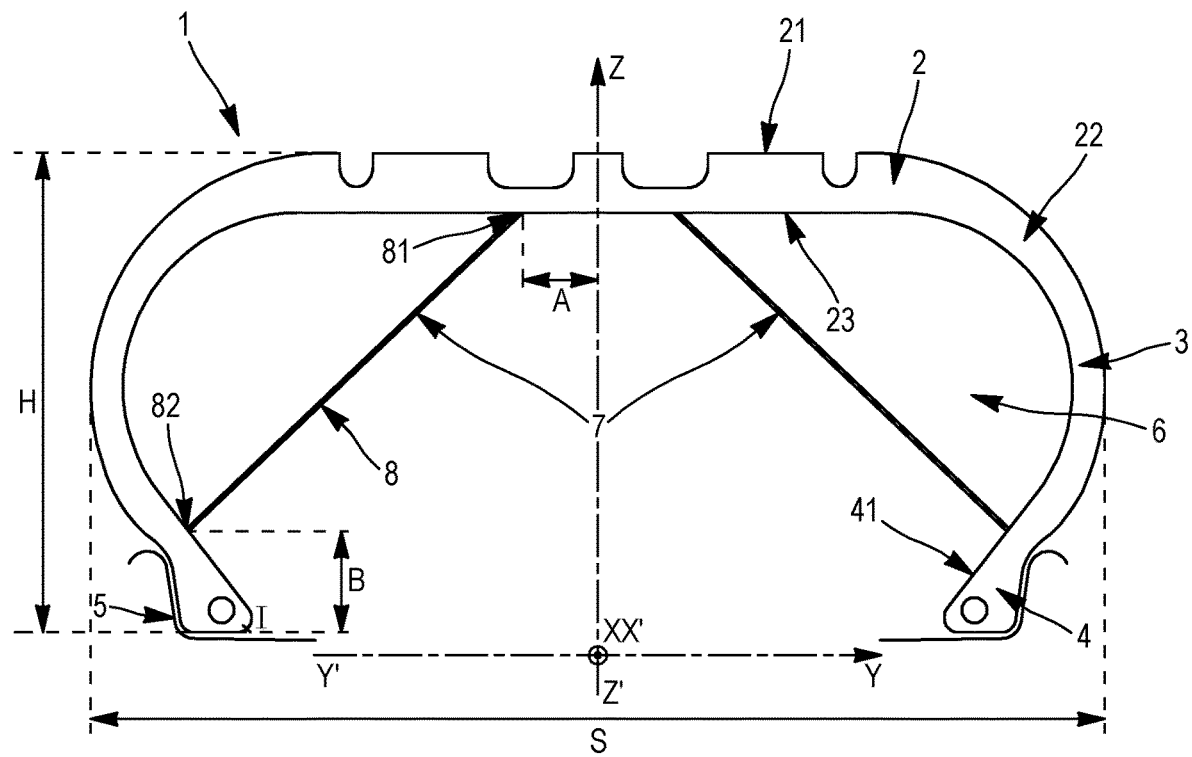
FIG. 1A: A meridian cross section through a tire according to a first embodiment of the invention.

FIG. 1A depicts a meridian cross section through a tire according to a first embodiment of the invention. The tire 1 depicted, which is for a passenger vehicle, is intended to be mounted on a nominal rim 5 and inflated to a nominal pressure P, and has an axial width S and a radial height H in the mounted and inflated state. The tire 1 comprises a crown 2 having a radially outer tread surface 21, intended to come into contact with the ground, and two axial ends 22, each extended radially towards the inside by a sidewall 3 and then by a bead 4 intended to come into contact with the rim 5. The crown 2, the sidewalls 3 and the beads 4 delimiting a toroidal interior cavity 6. The tire 1 has an equatorial plane XZ passing through the middle of its tread surface 21 and perpendicular to an axis of rotation YY'. According to this first embodiment of the invention, the tire 1 comprises a stiffening structure 7, comprising two stiffening elements 8 extending continuously in the toroidal interior cavity 6, from a crown interface 81 connected to a radially inner face of the crown 23, to a bead interface 82 connected to an axially inner face of the bead 41. The stiffening structure 7 is distributed circumferentially over the entire circumference of the tire. The two stiffening elements 8 that make up the stiffening structure 7 are not connected to one another inside the toroidal interior cavity 6, extend continuously in the toroidal interior cavity 6 without intersecting the equatorial plane XZ and are symmetric with respect to the equatorial plane XZ. The stiffening element 8 crown interface 81, necessarily the axially outermost one in this instance, given the presence of a single stiffening element 8 on each side of the equatorial plane XZ, is positioned, with respect to the equatorial plane letter XZ, at an axial distance A at most equal to 0.45 times the axial width S. The stiffening element 8 bead interface 82, necessarily the radially outermost one in this instance, is positioned, with respect to a radially innermost point I of the axially inner face of the bead 41, at a radial distance B at most equal to 0.5 times the radial height H. it should be noted that, in instances in which each stiffening element 8, as depicted in FIG. 1A, is of the one-dimensional or filamentary type, this element is not necessarily contained in a meridian plane YZ, but may potentially be inclined with respect to the meridian plane YZ.

Figure 1B:
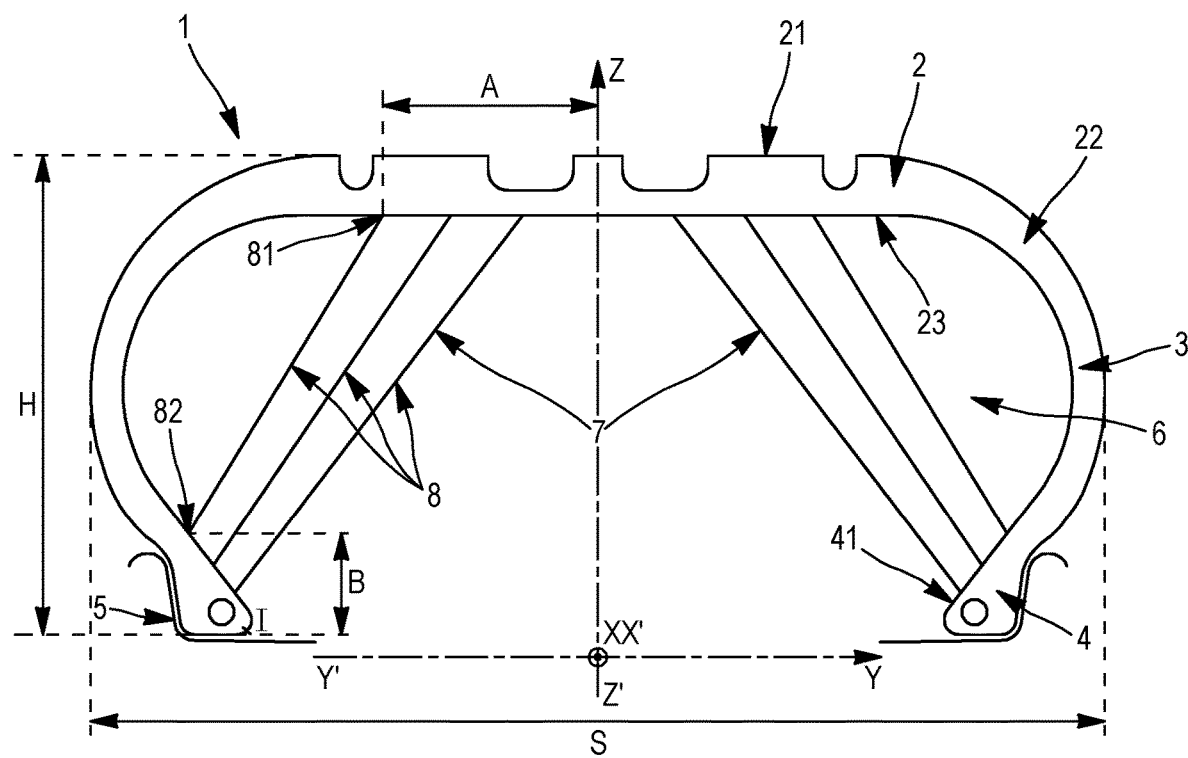
FIG. 1B: A meridian cross section through a tire according to a second embodiment of the invention.

FIG. 1B depicts a meridian section of a tire according to a second embodiment of the invention, in which the stiffening structure 7 comprises, on each side of the equatorial plane XZ, three stiffening elements 8 as previously described. The maximum characteristics regarding the respectively axial positioning, with axial distance A, and radial positioning, with radial distance B, relate to the axially outermost stiffening element on each side of the equatorial plane XZ.

Figure 1C:
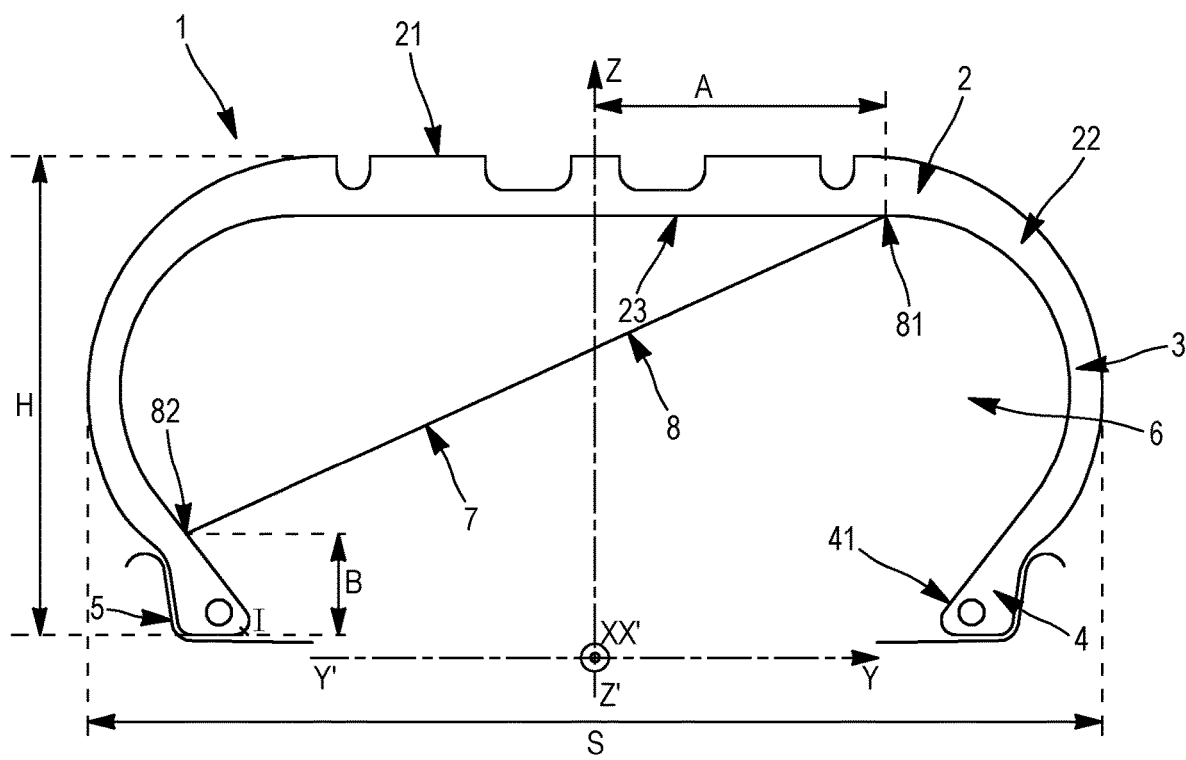
FIG. 1C: A meridian cross section through a tire according to a third embodiment of the invention.

FIG. 1C depicts a meridian section of a tire according to a third embodiment of the invention, in which the stiffening structure 7 comprises, a single stiffening element 8 passing across the toric cavity 6, intersecting the equatorial plane 7. This single stiffening element 8 conforms to the maximum characteristics regarding the respectively axial positioning, with axial distance A, and radial positioning, with radial distance B.

Figure 2:
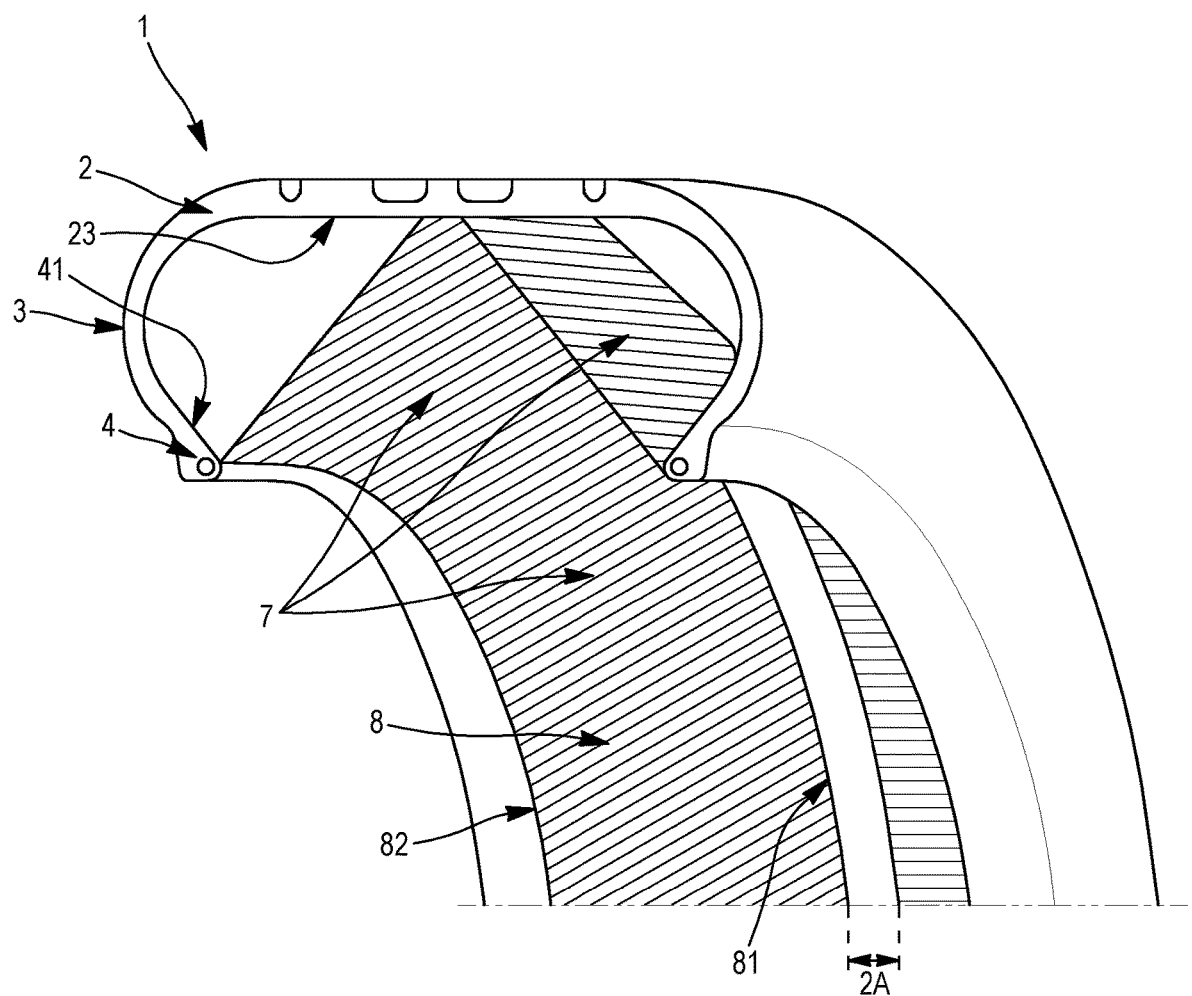
FIG. 2: A perspective view of a first example of a tire according to the invention, with two-dimensional stiffening elements of film type.

FIG. 2 depicts a partial perspective view of a first example of a tire according to the invention, comprising a stiffening structure 7 with two two-dimensional stiffening elements 8 of film type extending continuously in the toroidal interior cavity, from a crown interface 81 connected to a radially inner face of the crown 23, to a bead interface 82 connected to an axially inner face of the bead 41. These two two-dimensional stiffening elements 8 of the film type are symmetric about the equatorial plane of the tire. Since the crown interface 81 of each stiffening element 8 is positioned at an axial distance A away from the equatorial plane of the tire, the axial distance separating the two respective crown interfaces 81 is 2A. Each stiffening element 8, which exhibits symmetry of revolution about the axis of rotation of the tire, extends circumferentially and uniformly around the entire circumference of the tire.

Figure 3:
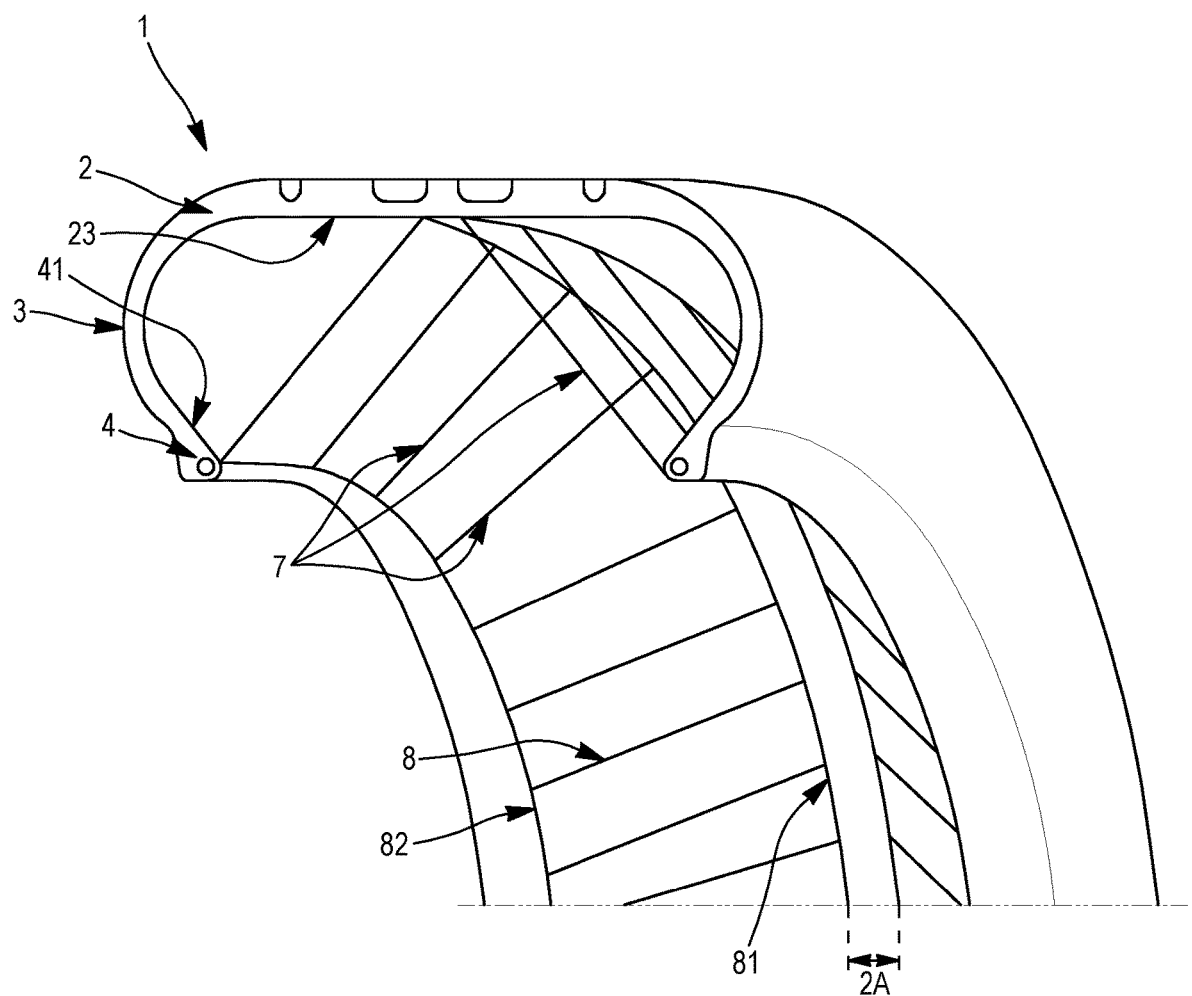
FIG. 3: A perspective view of a second example of a tire according to the invention, with one-dimensional stiffening elements of cord type.

FIG. 3 depicts a partial perspective view of a second example of a tire according to the invention, comprising a stiffening structure 7 with one-dimensional stiffening elements 8 of cord type extending continuously in the toroidal interior cavity, from a crown interface 81 connected to a radially inner face of the crown 23, to a bead interface 82 connected to an axially inner face of the bead 41. These one-dimensional stiffening elements 8 of the cord type are divided between two groups that are symmetric about the equatorial plane of the tire. The stiffening elements of each group are distributed circumferentially and uniformly over the entire circumference of the tire and are therefore spaced apart, one from its pair, by a constant spacing. Since, as in the embodiment of FIG. 2, the crown interface 81 of each stiffening element 8 being positioned at an axial distance A away from the equatorial plane of the tire, the axial distance separating the two respective crown interfaces 81 of two symmetric stiffening elements 8 is 2A.

Figure 4:
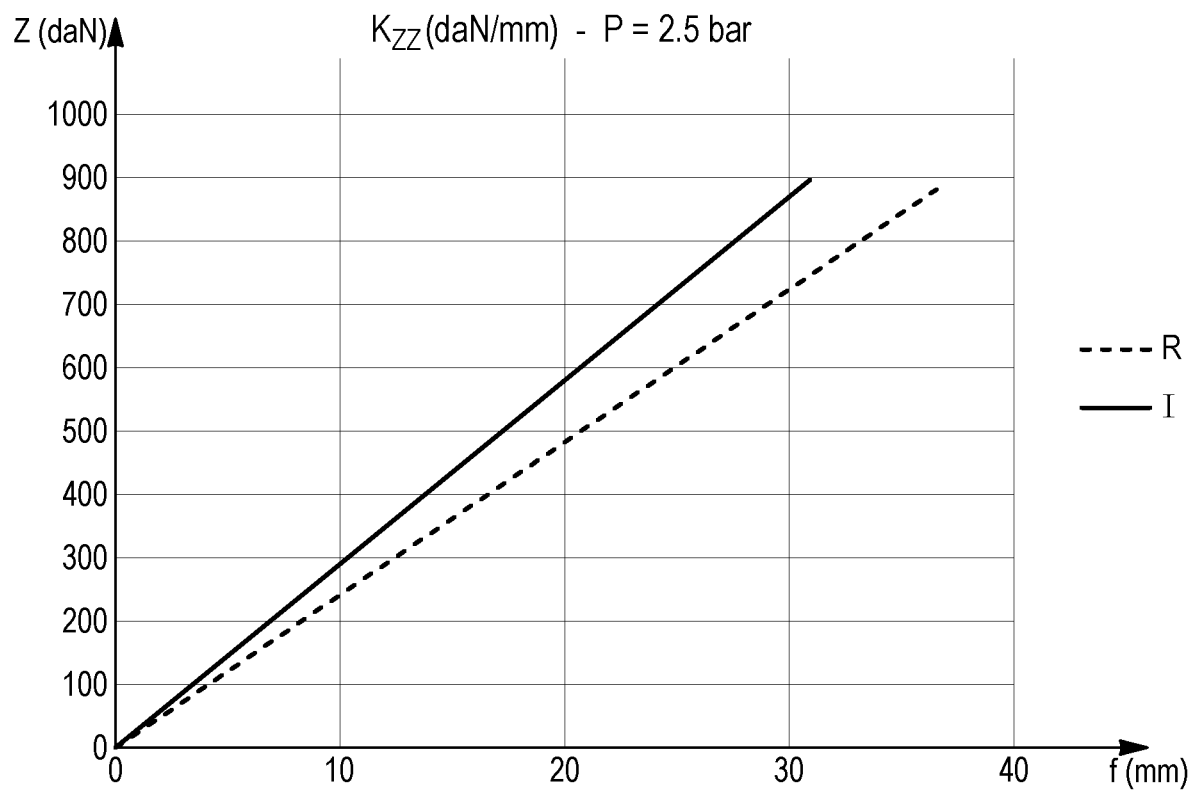
FIG. 4: Comparison of radial stiffnesses $K_{ZZ}$ between a tire according to the invention and a reference tire of the prior art.

FIG. 4 is a graph showing a comparison of radial stiffnesses $K_{ZZ}$ between a tire according to the invention and a reference tire of the prior art. For a given inflation pressure P and a given radial distortion f, the radial force Z generated by the tire according to the invention is higher than that generated by the reference tire. The gradient of the curve of radial force Z as a function of the radial distortion f of the tire, namely the radial displacement of the crown of the tire, represents the radial stiffness $K_{ZZ}$ of the tire. Therefore, the radial stiffness $K_{ZZ}$ of the tire according to the invention is higher than that of the reference tire.

Figure 5:
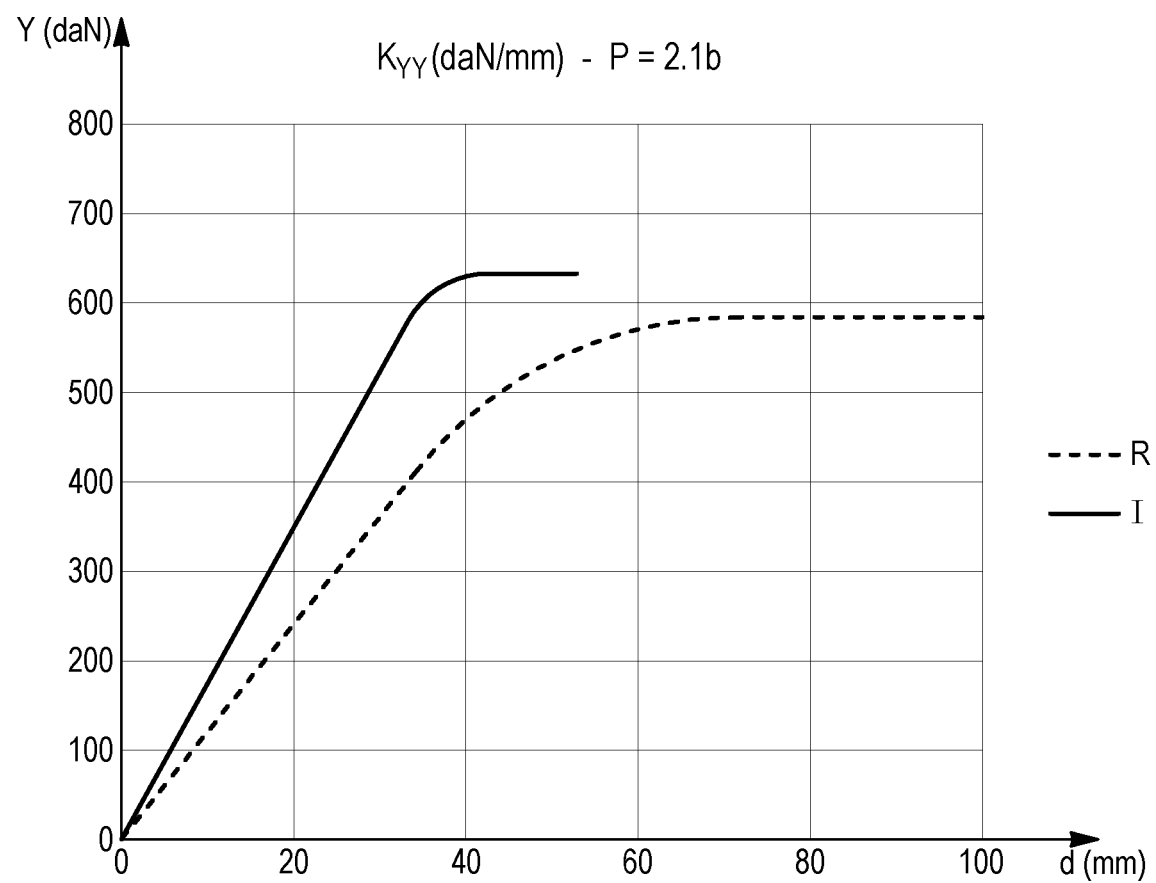
FIG. 5: Comparison of transverse or axial stiffnesses $K_{YY}$ between a tire according to the invention and a reference tire of the prior art.

FIG. 5 is a graph showing a comparison of transverse stiffnesses $K_{YY}$ between a tire according to the invention and a reference tire of the prior art. For a given inflation pressure P, a given radial distortion f, and a given transverse offset d, the transverse force Y generated by the tire according to the invention is higher than that generated by the reference tire. The gradient of the substantially linear portion of the curve of transverse force Y as a function of the transverse offset d of the tire, namely the transverse displacement thereof, represents the transverse stiffness $K_{YY}$ of the tire. The substantially linear portion of the curve of transverse force Y corresponds, in the instance depicted, to a transverse offset at most equal to around 30 mm. Therefore, the transverse stiffness $K_{YY}$ of the tire according to the invention is higher than that of the reference tire. Upwards of 30 mm of transverse offset, the transverse force Y reaches a plateau because of the slipping of the tread surface of the tire across the ground. In the case of the invention, this is stabilizing of the transverse force Y occurs at a higher level, because of the higher transverse stiffness $K_{YY}$ making it possible to maintain a more uniform distribution of pressure in the contact patch, under transverse force Y.

The invention has been studied more particularly in the case of a passenger vehicle tire of size 205/55R16. Thus, a reference tire R was compared against a first example of a tire I1 according to the invention, with two-dimensional stiffening elements of the film type, shown in FIG. 2, and with a second example of a tire I2 according to the invention, with one-dimensional stiffening elements of the cord type, shown in FIG. 3.

The respective tires, R reference, I1 according to the invention, and I2 according to the invention are intended to be mounted on a nominal 6.5J16 rim and inflated to a nominal pressure P of 2.5 bar. Their axial widths S and their radial heights H, in the mounted and inflated state, are respectively equal to 209 mm and 104 mm.

The first example I1 is characterized by a stiffening structure, as depicted in FIG. 2, with two two-dimensional stiffening elements of film type which are symmetric with respect to the equatorial plane of the tire. Each two-dimensional stiffening element is made up of a juxtaposition of strips, each strip having a width of 6 cm, with a tolerance of 1 cm. The material of the strips is a fabric made up of textile reinforcers made of polyester coated with an elastomer compound, the said textile reinforcers having a unit section equal to 0.42 mm² and being distributed at a constant spacing equal to 0.96 mm. The textile reinforcers are positioned radially, namely in meridian planes of the tire. In order to make up the crown interface, the radially outer end of each strip is secured to the radially inner face of the crown by hot vulcanizing. In order to make up the bead interface, the radially inner end of each strip is clamped between the bead and the rim. Furthermore, the axial distance A is comprised between 0.05 times and 0.15 times the axial width S of the tire, and the radial distance B is at most equal to 0.05 times the radial height H of the tire.

The second example I2 is characterized by a stiffening structure, as depicted in FIG. 3, with one-dimensional stiffening elements of cord type which are distributed in two groups which are symmetric with respect to the equatorial plane of the tire. Each one-dimensional stiffening element is a textile reinforcer made up of a combination of an aromatic polyamide of the aramid type, and an aliphatic polyamide of the nylon type, with a unit section equal to 1 mm². The stiffening elements in each group are distributed circumferentially and uniformly over the entire circumference of the tire and are spaced each from its pair by a constant spacing equal to 30 mm and are inclined, with respect to a meridian plane, by an angle substantially equal to 10°. The respective crown and bead interfaces of each one-dimensional stiffening element are created by connecting the corresponding ends to attachments positioned respectively on the axially inner face of the crown and on the axially inner face of the bead before the tire is cured.

Table 1 below summarizes the differences in performance obtained respectively between the first example of a tire I1 and the reference tire R, and between the second example of a tire I2 and the reference tire:

TABLE 1

| Performance characteristics | Difference in performance between the tire I1 and the tire R | Difference in performance between the tire I2 and the tire R |
|---|---|---|
| Radial stiffness $K_{ZZ}$ | +20% | 0% |
| Transverse stiffness $K_{YY}$ | +50% | +30% |
| Cornering stiffness $D_Z$ | +5% (Z = 480daN) +20% (Z = 800daN) | Not determined |
| Rolling resistance (calculated) | −0.2 kg/t | Not determined |

The results of Table 1 show an improved compromise in performance between the rolling resistance and the handling for the invention. It should be noted that this compromise is variable: a first example I1, characterized by a high density of textile reinforcers, offers a greater shift in performance than the second example I2, which itself represents a shift with respect to the reference tire R.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A vehicle tire, configured to be mounted on a nominal rim and inflated to a nominal pressure P, the tire having an axial width S and a radial height H in a mounted and inflated state, and comprising:
    a crown having a radially outer tread surface, configured to come into contact with the ground, and two axial end portions ends, each extended radially inwardly by a sidewall of the tire and then by a bead of the tire configured to come into contact with the rim;
    wherein the crown, the sidewalls and the beads delimit a toroidal interior cavity of the tire;
    wherein the tire has an equatorial plane passing through a middle of the tread surface and perpendicular to an axis of rotation of the tire,
    wherein the tire comprises a stiffening structure, which is distributed circumferentially over an entire circumference of the tire and which comprises at least one elongated stiffening element extending in length continuously in the toroidal interior cavity without intersecting the equatorial plane, from a crown interface, which is integral with the at least one elongated stiffening element as a first longitudinal end portion of the at least one elongated stiffening element and which is directly connected as a cured connection to a radially inner face of the crown to a bead interface, which is integral with the at least one elongated stiffening element as a second longitudinal end portion of the at least one elongated stiffening element and which is directly connected as a cured connection to an axially inner face of one of the beads, the at least one stiffening element not dividing the toroidal interior cavity into several mutually sealed and independent cavities, and
    wherein at least one of:
        the axially outermost crown interface is positioned, with respect to the equatorial plane, at an axial distance A at most equal to 0.15 times and at least equal to 0.05 times the axial width S; and
        the radially outermost bead interface is positioned, with respect to a radially innermost point of the axially inner face of the bead, at a radial distance B at most equal to 0.10 times the radial height H.

2. The tire according to claim 1, wherein the at least one elongated stiffening element comprises several elongated stiffening elements that are not joined to one another in the toroidal interior cavity.

3. The tire according to claim 1, wherein the stiffening structure is symmetric with respect to the equatorial plane.

4. The tire according to claim 2, wherein the elongated stiffening elements are identical to each other.

5. The tire according to claim 1, wherein the at least one elongated stiffening element comprises a polymeric material, a metal material, or a glass- or carbon-type material or any combination thereof.

6. The tire according to claim 1, wherein the at least one elongated stiffening element is two-dimensional.

7. The tire according to claim 6, wherein the at least one elongated stiffening element is made up of a reinforcing fabric comprising reinforcing elements coated in an elastomer compound.

8. The tire according to claim 1, wherein the at least one elongated stiffening element is a one-dimensional element and is of filament or cord type.

9. The tire according to claim 1, wherein the at least one elongated stiffening element is placed in the toroidal interior cavity so that the first longitudinal end portion and the second longitudinal end portion of the at least one elongated stiffening element are positioned respectively on the radially inner face of the crown and on the axially inner face of the bead before the tire is cured.

* * * * *